(12) United States Patent
Elliott et al.

(10) Patent No.: US 10,168,738 B2
(45) Date of Patent: Jan. 1, 2019

(54) FUEL CELLS IN LAPTOP COMPUTER DEVICES

(71) Applicant: Intelligent Energy Limited, Loughborough (GB)

(72) Inventors: Zachary Elliott, Loughborough (GB); Hossein Ostadi, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/519,050

(22) PCT Filed: Oct. 6, 2015

(86) PCT No.: PCT/GB2015/052912
§ 371 (c)(1),
(2) Date: Apr. 13, 2017

(87) PCT Pub. No.: WO2016/059374
PCT Pub. Date: Apr. 21, 2016

(65) Prior Publication Data
US 2017/0220071 A1    Aug. 3, 2017

(30) Foreign Application Priority Data
Oct. 14, 2014    (GB) .................................. 1418168.9

(51) Int. Cl.
*G06F 1/16*    (2006.01)
*H01M 8/00*    (2016.01)
(Continued)

(52) U.S. Cl.
CPC .......... *G06F 1/1635* (2013.01); *G06F 1/1681* (2013.01); *G06F 1/1683* (2013.01);
(Continued)

(58) Field of Classification Search
CPC ...... G06F 1/1681; G06F 1/1683; G06F 1/203; G06F 1/1635; G06F 1/206; H01M 8/006;
(Continued)

(56) References Cited

U.S. PATENT DOCUMENTS 6,447,945 B1 * 9/2002 Streckert ............... G06F 1/1616
204/267
2003/0157389 A1 8/2003 Kornmayer
(Continued)

FOREIGN PATENT DOCUMENTS

WO    2002061861    8/2002

OTHER PUBLICATIONS

International Search Report and Written Opinion in International Patent Application No. PCT/GB2015/052916 dated Feb. 5, 2016.

*Primary Examiner* — Dimary Lopez Cruz
*Assistant Examiner* — Ingrid Wright
(74) *Attorney, Agent, or Firm* — Baker & Hostetler LLP

(57) ABSTRACT

A portable computing device such as a laptop computer has a base unit (2) and a display screen unit (3) coupled together by a hinge assembly (7) configured to allow rotation of the base unit and the screen unit relative to one another. The display screen unit has a display panel on a first face of the display screen unit and a fuel cell array (12a, 12b) disposed adjacent to a second face of the display screen unit. Ventilation apertures through the second face of the display screen unit provide air flow to the fuel cell array. A fuel conduit extends between the base unit and the display screen unit across the hinge assembly for delivering fuel from the base unit to the display screen unit.

15 Claims, 4 Drawing Sheets

(51) Int. Cl.
  *H01M 8/04082* (2016.01)
  *G06F 1/20* (2006.01)
  *H01M 8/04089* (2016.01)

(52) U.S. Cl.
  CPC ............ *G06F 1/203* (2013.01); *H01M 8/006* (2013.01); *H01M 8/04201* (2013.01); *G06F 2200/202* (2013.01); *H01M 8/04089* (2013.01); *H01M 2250/30* (2013.01); *Y02B 90/18* (2013.01)

(58) Field of Classification Search
  CPC ......... H01M 8/04201; H01M 8/04559; H01M 8/0494; H01M 8/0491
  See application file for complete search history.

(56) References Cited

U.S. PATENT DOCUMENTS

| | | | |
|---|---|---|---|
| 2004/0136156 A1 | 7/2004 | Nakamura et al. | |
| 2005/0074656 A1 | 4/2005 | Koyama et al. | |
| 2005/0089743 A1 | 4/2005 | Lee | |
| 2006/0056157 A1 | 3/2006 | Ford et al. | |
| 2008/0102333 A1* | 5/2008 | Watanabe | H01M 8/04186 429/449 |
| 2012/0224299 A1* | 9/2012 | Myers | H05K 5/0086 361/679.01 |
| 2014/0049984 A1* | 2/2014 | Chen | G02B 6/0085 362/611 |

* cited by examiner

FUEL CELLS IN LAPTOP COMPUTER DEVICES

CROSS-REFERENCE TO RELATED APPLICATIONS

This patent application is a National Stage Application of international patent application PCT/GB2015/052912 filed Oct. 6, 2015, which claims priority to Great Britain patent application 1418168.9, filed Oct. 14, 2014, the disclosures of which are incorporated by reference in their entirety.

The present invention relates to electronic devices incorporating fuel cells, and in particular to techniques for the integration of fuel cells into portable computing devices.

Portable computing devices are in widespread use, particularly in the form of notebook or laptop devices with a display screen panel forming a lid which is hinged to and foldable relative to a base unit which includes the keyboard, processor, power supply and electrical connector sockets. Such portable computing devices are commonly powered by an integrated battery pack when mains power is not available. Battery technology is such that integrated battery packs generally do not provide sufficient power to the laptop for more than 5-10 hours of use before recharging is necessary. Consumer demand is generally for greater battery capacity to enable longer periods of use of the computing device without recourse to mains power.

Electrochemical fuel cells are a possible alternative source of electrical power for many electronic devices, particularly in view of their ability to provide electrical energy from fuel sources having a potentially higher energy density than many battery technologies. However, fuel cells generally have particular physical configurations and support infrastructure requirements that make it difficult to integrate such fuel cells into common portable devices. Fuel cells are generally arranged in a stack configuration in which multiple fuel cells are disposed in a layered structure allowing them to be electrically connected in series. This makes for a relatively bulky format not ideally suited for integration into thin consumer electronic devices. Fuel cells also require a support infrastructure for the delivery of fluid fuel and oxidant, and may also require water circulation to a fuel source.

It is an object of the present invention to provide a convenient and efficient way to integrate a fuel cell power supply into portable electronic devices.

According to one aspect, the present invention provides a portable computing device having a base unit and a display screen unit coupled together by a hinge assembly configured to allow rotation of the base unit and the screen unit relative to one another, the display screen unit having a display panel on a first face of the display screen unit and a fuel cell array disposed adjacent to a second face of the display screen unit.

The portable computing device may include ventilation apertures through the second face of the display screen unit configured to provide air flow to the fuel cell array. The portable computing device may include a fuel conduit extending between the base unit and the display screen unit across the hinge assembly, the fuel conduit configured for delivering fuel from the base unit to the display screen unit. The fuel conduit may extend through the hinge assembly. The portable computing device may include a fuel source incorporated within the base unit. The portable computing device may include a fuel supply connector within the base unit. The portable computing device may include a power conductor extending between the fuel cell array in the display screen unit and the base unit via the hinge assembly. The portable computing device may include a water conduit extending between the fuel cell array in the display screen unit and the base unit through the hinge assembly. The portable computing device may include an air flow conduit extending between the base unit and the display screen unit across the hinge assembly, the air flow conduit providing an air flow path extending between a fan in the base unit and the fuel cell array in the display screen unit. The portable computing device may include a thermal barrier disposed between the fuel cell array and the display panel. The thermal barrier may comprise a thermally conductive planar element having an in-plane thermal conductivity substantially greater than its through-plane thermal conductivity. The ventilation apertures may comprise an array of apertures in hexagonal configuration. The ventilation apertures may define a grid of between 50% and 80% aperture density. The ventilation apertures may be defined by a mesh comprising a hydrophobic coating. The ventilation apertures may have a hydrophobic mesh positioned thereover. The portable computing device may include a fluid conduit extending between the display screen unit and the base unit, the fluid conduit providing a purge fluid flow path from a purge outlet of the fuel cell array to a fan duct in the base unit. The portable computing device may include a fuel cell controller operable on, or interfacing with, a main data processing engine of the portable computing device.

According to another aspect, the present invention provides a portable computing device having a base unit and a display screen unit coupled together by a hinge assembly configured to allow rotation of the base unit and the screen unit relative to one another, at least one fluid conduit extending from the base unit to the display screen unit across the hinge assembly.

The at least one fluid conduit may comprise an air flow conduit extending between an air intake in the display screen unit and a fuel cell in the base unit.

Embodiments of the invention will now be described by way of example and with reference to the accompanying drawings in which.

Figure 1:
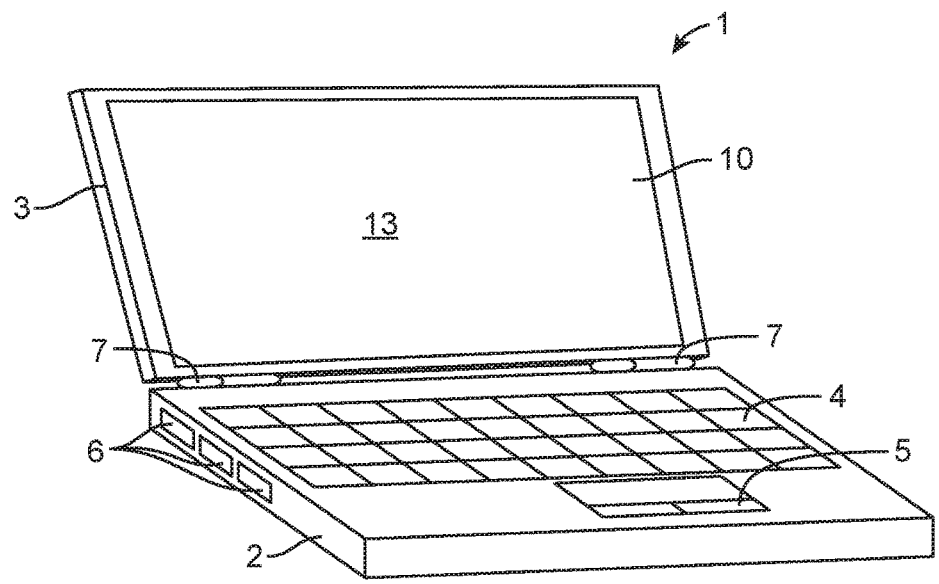
FIG. 1 shows a perspective front side view of a laptop computer having planar fuel cell arrays incorporated into the lid of the laptop.
Figure 2:
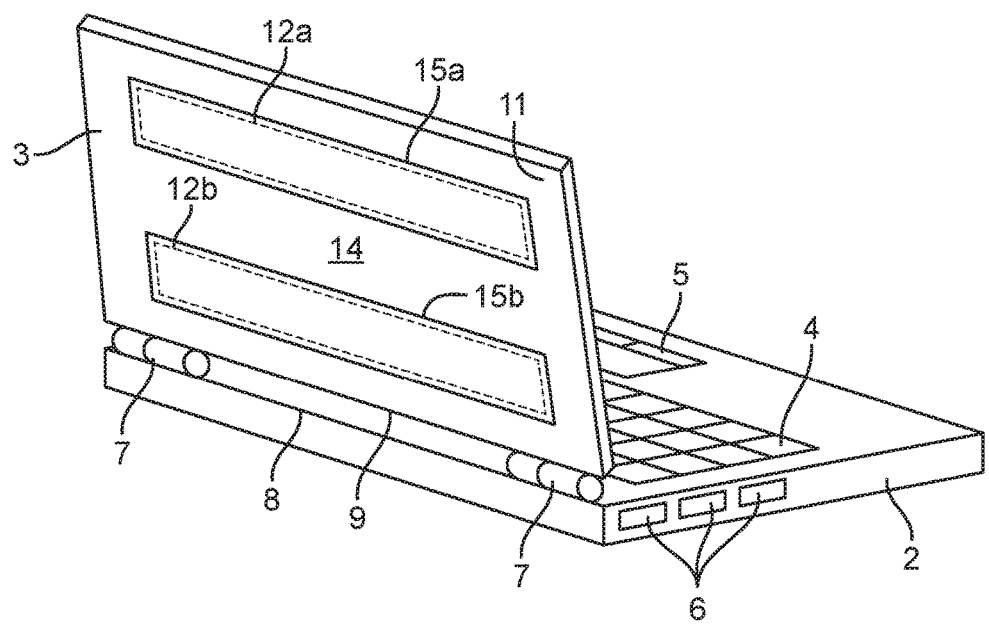
FIG. 2 shows a perspective rear side view of the laptop computer of FIG. 1 showing the position of the planar fuel cell arrays.

With reference to FIGS. 1 and 2, a portable computing device is exemplified by a laptop computer 1 which comprises a base unit 2 and a display screen unit 3 which are in conventional foldable relationship to one another so that the display screen unit 3 can form a lid which is closable over the base unit 2 and can also be rotated to an elevated position (as shown) to serve as a display. The base unit 2 preferably comprises a keyboard 4, a touchpad interface 5, a processor and operational electronics (not shown in FIGS. 1 and 2), and electrical connector sockets 6 for power and data input/output interconnections.

The display screen unit 3 comprises a display panel 10 on a first face 13 of the display screen unit 3 and a protective cover 11 which forms a second face 14 of the display screen unit 3. The first face 13 may be considered as comprising an inward face of the display screen unit 3 or lid, and the protective cover 11 may be considered as comprising the outward face of the display screen unit 3.

A hinge assembly 7 provides a coupling between the base unit 2 and the display screen unit 3 and enables relative rotation of the two units, to enable opening and closing of the lid. One possible hinge assembly 7, as shown, comprises at least two separate hinges, one at each side of the base unit 2.

Figure 3:
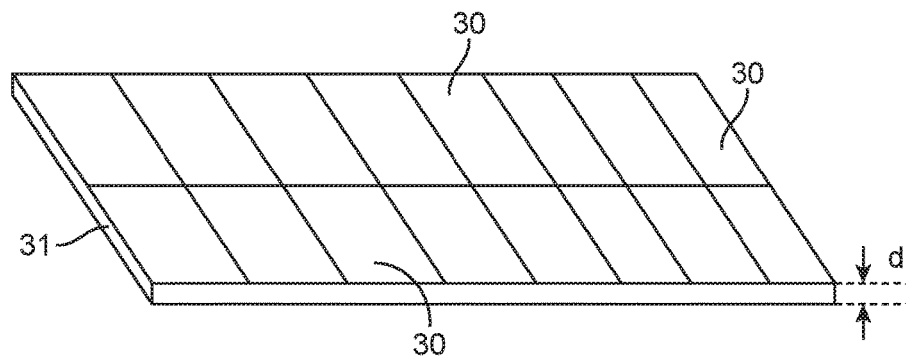
FIG. 3 shows a perspective view of a planar fuel cell array suitable for use in the laptop computer of FIG. 1.

As shown in FIG. 3, a fuel cell array 31 suitable for use in the portable computing device 1 of FIGS. 1 and 2 is formed as a substantially planar array which comprises only one fuel cell in thickness/depth d while incorporating plural fuel cells 30 side-by-side in a two-dimensional array. A one-dimensional array comprising only a single row of fuel cells 30 is another option. The fuel cells 30 can be electrically connected in series or in parallel, or both (i.e. groups of parallel-connected cells 30 connected in series), as desired, according to the electrical performance required. This planar array contrasts with many conventional fuel cell stacks which have all cells physically and electrically connected in series, one on top of the other.

The thin physical profile of planar fuel cell arrays 31 makes them particularly convenient for positioning within the display screen unit 3 of the portable computing device 1, and more particularly behind the display panel 10, e.g. between the display panel 10 and the protective cover 11. The internal position is illustrated in dashed outlines 12a, 12b in FIG. 2. In the arrangement shown in FIG. 2, two fuel cell arrays 12a, 12b are deployed, each behind a ventilation grille 15a, 15b. Each ventilation grille 15a, 15b comprises a plurality of ventilation apertures in an array of apertures which provide both an inlet and an outlet for cathode air flows to reach the fuel cells 30 and for humid air to escape from the fuel cells. Although the fuel cell arrays 31 are shown having only one layer of fuel cells in the array, in the depth d there may be two or more layers of fuel cells, provided that the thickness or depth d is kept suitably thin for the application as further described below.

Fuel cells 30 may generate significant quantities of heat, and the positioning of planar arrays 31 of fuel cells 30 in the display screen unit 3 conveniently places the fuel cell arrays well away from other heat generating components which are usually found in a laptop base unit 1, including processor integrated circuits and a battery. Positioning the fuel cell arrays 31 in the display screen unit 3 also places the heat-generating fuel cells in a portion of the computing device 1 which is generally upright when in use with free airflow therearound, e.g. not resting on a surface such as a table or user's lap. This assists in maintaining adequate ventilation and cooling of the fuel cells.

Fuel cells 30 may each be fabricated from a number of layers including a proton exchange membrane in a membrane-electrode assembly, anode and cathode gas diffusion layers and flow field plates for delivering anode and cathode fluids to the membrane. These layers must be kept in compression to ensure good gas tight seals around the various components and to ensure that anode and cathode fluid flows cannot leak out of the fuel cell assembly or around the membrane. Such compression is conventionally provided by thick plates at each face of a fuel cell stack. However, for mounting the fuel cell array 31 in the generally very thin display screen unit 3 behind a display panel 10, preferably the lid or protective cover 11 itself is configured to provide sufficient compression to the fuel cell array 31, while still providing a lid thickness of less than a few millimeters. However, a large area of ventilation grille 15a, 15b may weaken the cover 11 and reduce its ability to provide the desirable fuel cell array compression unless specially configured.

Figure 4:
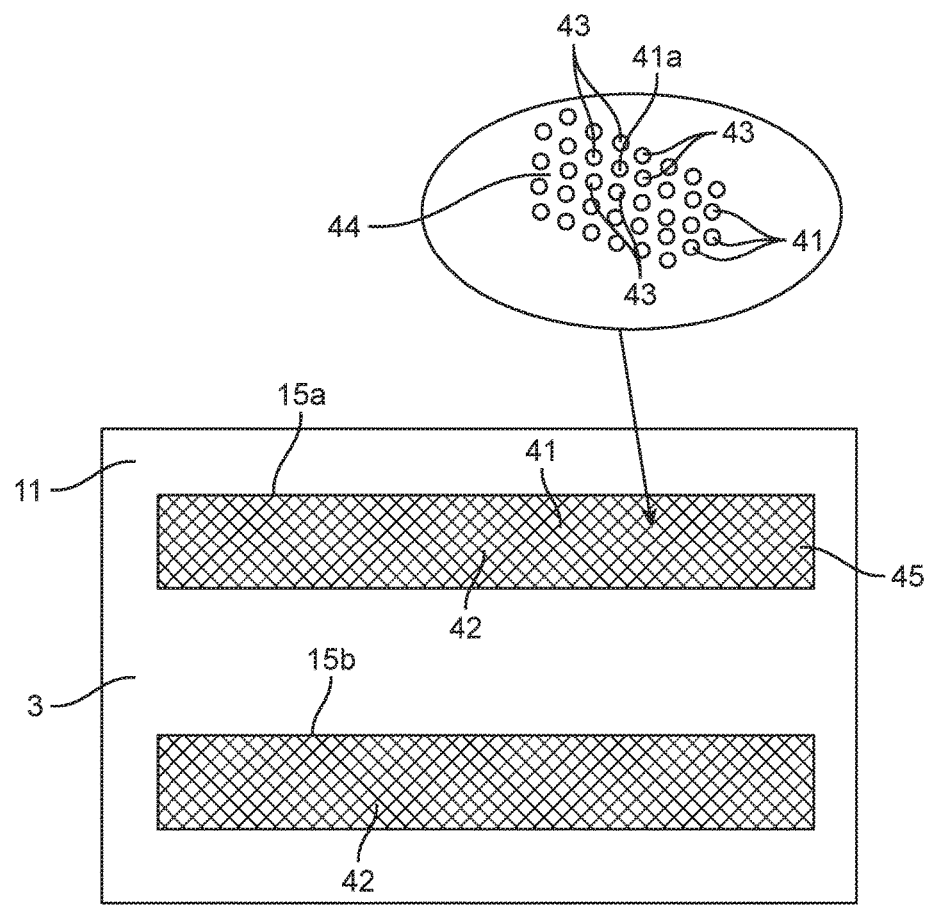
FIG. 4 shows a schematic plan view of a ventilation grille for the planar fuel cell arrays incorporated into the lid of the laptop computer of FIG. 1.

In one arrangement as shown in FIG. 4, the protective cover 11 is formed from an aluminium sheet and ventilation apertures 41 form an array 42 of apertures 41 in a hexagonal (e.g. honeycomb) configuration, e.g. in which each aperture 41a is immediately adjacent to six other apertures 43, as more clearly shown in the inset diagram. The array 42 may comprise apertures 41 defined by a mesh 44 of the aluminium or other lid material 45 such that the apertures 41 together have a density of about 60%, i.e. the apertures 41 form approximately 60% of the area within the grille 15a, 15b and the lid material 45 forms about 40% of the area within the grille 15a, 15b. More generally, the aperture density may be in the range 50% to 70% or 50% to 80%. The apertures 41 themselves may be any suitable shape, e.g. circular or polygonal shape. The hexagonal array configuration may be optimal for providing a good balance of aperture density and compression strength of the lid material, by avoiding long slits or lines of apertures which may create linear regions of weakness which do not provide good compression to the underlying fuel cell array 31.

Figure 5:
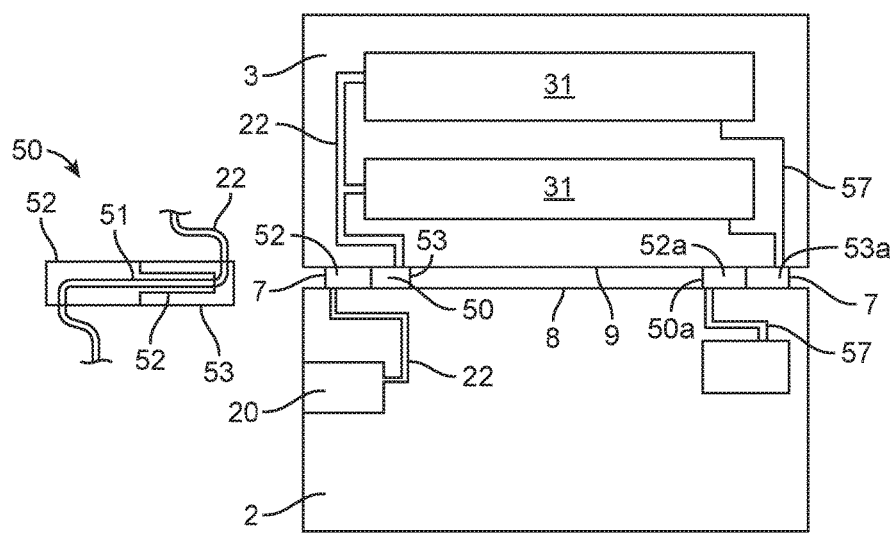
FIG. 5 shows a schematic plan view of an arrangement of internal components for the laptop computer of FIG. 1 with an inset schematic view of a hinge element thereon.
Figure 6:
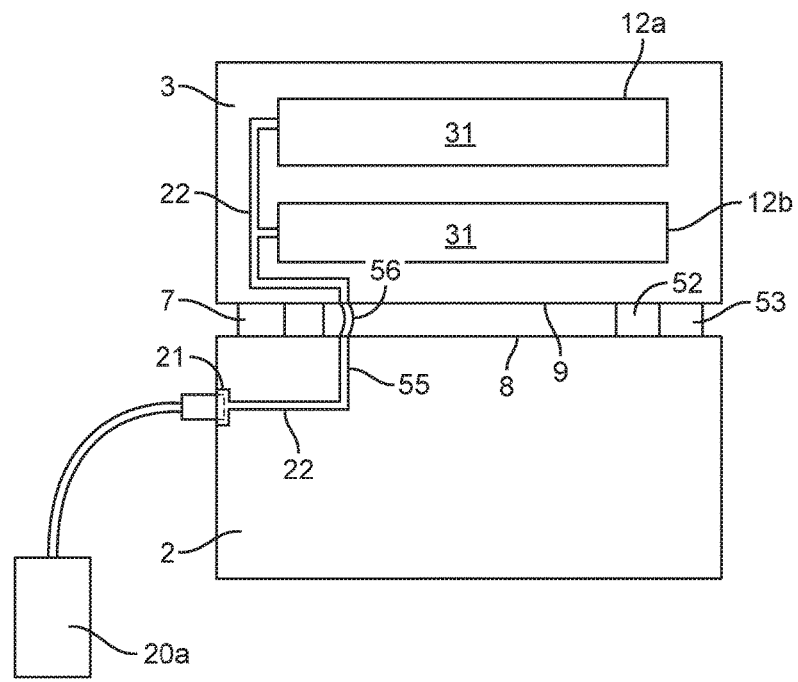
FIG. 6 shows a schematic plan view of an alternative arrangement of internal components for the laptop computer of FIG. 1.

With reference to FIG. 5, the base unit 2 may house a fuel source 20 for supplying fluid fuel to the fuel cell arrays 31 in the display screen unit 3. A suitable fuel may be hydrogen and the fuel source 20 may comprise any suitable form of cartridge or reservoir containing the fluid fuel. The fuel source 20 may comprise a reactor for generating the fluid fuel on demand. The fuel source 20 may comprise a disposable cartridge which can be plugged into the base unit 2 as required. Alternatively, as shown in FIG. 6, the fuel source may be external to the base unit 2 and the base unit may include a fluid fuel connector 21 for connecting a fuel source 20a to the base unit. In each case, the fuel source 20, 20a is provided within or connected to the base unit 2 and a fuel conduit 22 extends between the base unit 2 and the display screen unit 3 across the hinge assembly 7.

FIG. 5 shows an arrangement in which the fuel conduit 22 extends from the fuel source 20 in the base unit 2 through one hinge 50 of the hinge assembly 7, to the fuel cell arrays 31 within the display screen assembly 3. As illustrated in the inset diagram of FIG. 5, the fuel conduit 22 may be a flexible pipe 51 extending through a first hollow hinge element 52 which rotates within a second hollow hinge element 53. In an alternative configuration, as exemplified in FIG. 6, the fuel conduit 55 may extend across the hinge assembly 7, e.g. as a flexible pipe 56 extending between a back edge 8 (see also FIG. 2) of the base unit 2 and an adjacent edge 9 of the display screen unit 3.

Also as seen in FIG. 5, a power conductor 57 may extend from the fuel cell arrays 12a, 12b to the base unit 2 via the hinge assembly 7. The power conductor 57 may comprise a power cable which passes through one hinge 50a of the hinge assembly 7. The power conductor 57 may pass through a first hollow hinge element 52a which rotates within a second hollow hinge element 53a, in similar manner to the fuel conduit 51 described above.

In use, hydrogen fuel cells 30 generate water as a by-product. This water may be useable by the fuel cartridge 20 disposed within the base unit 2, for the generation of hydrogen from a suitable reactant, such as a metal hydride (e.g. sodium borohydride or aluminium hydride). A water conduit may extend between the fuel cell arrays 31 in the display screen unit 3 and the base unit 2, via the hinge assembly 7 in exactly analogous manner to that described in relation to the fuel conduit 22 of FIG. 5 or FIG. 6. Thus, the water conduit may extend through one hinge 50 of the hinge assembly 7, and may comprise a flexible pipe extending through the first hollow hinge element 52 and the second hollow hinge element 53. Alternatively, the water conduit may extend across the hinge assembly 7, e.g. as a flexible pipe extending between the back edge 8 of the base unit 2 and an adjacent edge 9 of the display screen unit 3.

Figure 7:
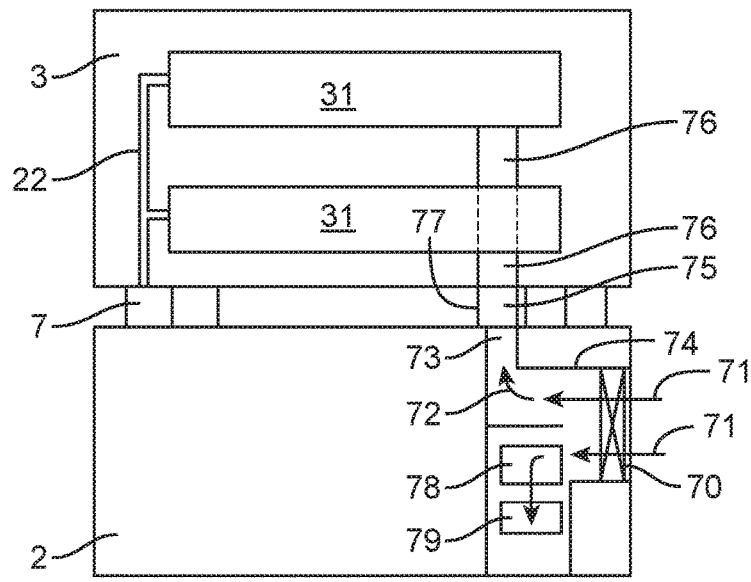
FIG. 7 shows a schematic plan view of an arrangement of internal components for the laptop computer of FIG. 1.

With reference to FIG. 7, in another arrangement, fan assisted air flow to the fuel cell cathodes may be required. FIG. 7 shows an arrangement in which a portion 72 of air flow 71 displaced by a cooling fan 70 in the base unit 2 is transferred to the display screen unit 3 across the hinge assembly 7. In the preferred arrangement shown, a first air flow path 73 extends from a fan duct 74 in the base unit 2 to an airflow guide 75 which traverses the hinge assembly 7, and a second air flow path 76 extends from the air flow guide 75 to the fuel cell arrays 12a, 12b in the display screen unit 3. The air flow guide 75 may comprise a flexible conduit which traverses the hinge assembly 7. The flexible conduit 75 may, for example, comprise concertina-type walls 77 which can conform to changes in the relative angle between the display screen unit 3 and the base unit 2 without occluding the conduit, for a large range of possible angles. In another arrangement, the air flow guide may comprise a pair of guide elements, one in the base unit 2 and one in the display screen unit 3 which are brought into alignment for air flow through both guide elements when the display screen unit is in an operational position, i.e. at an oblique angle to the base unit. Alternatively, the air flow conduit may pass axially through hollow hinge elements 52, 53 as described in relation to FIG. 5. A second air flow path 78 extends over or past electronic components 79 for cooling thereof.

Figure 8:
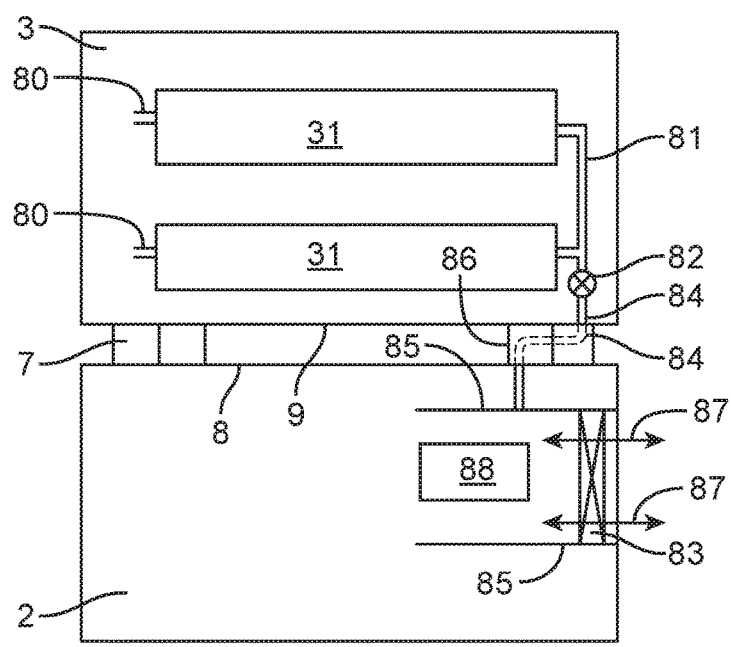
FIG. 8 shows a schematic plan view of an arrangement of internal components for the laptop computer of FIG. 1.

Some types of fuel cells 30 in fuel cell arrays 31 may require a periodic purge of the anode. As shown in FIG. 8, the anode may be configured with an anode inlet 80 for receiving hydrogen fuel at one end of an anode flow path, and a purge outlet 81 at a distal end of the anode flow path. The purge outlet 81 is normally closed by valve 82. A purge may be carried out by opening the purge valve 82 and passing excess hydrogen into the anode via anode inlet 80, to create a through-flow of hydrogen. A separate purge valve may be provided for each fuel cell array 31. During a purge cycle, excess hydrogen may be vented to atmosphere. It may be advantageous to dilute the purge hydrogen within an air flow from a cooling fan 83 in the base unit 2.

Thus, in the arrangement as shown in FIG. 8, there may be provided a purge gas conduit 84 extending across the hinge assembly 7. The purge gas conduit 84 extends from the anode purge outlet 81 to the fan duct 85 in the base unit 2, through one hinge 86 of the hinge assembly 7. The purge gas conduit 84 may be a flexible pipe extending through a first hollow hinge element 52 and a second hollow hinge element 53 as previously described in relation to FIG. 5. In an alternative configuration, the purge gas conduit 84 may extend across the hinge assembly 7, e.g. as a flexible pipe extending between a back edge 8 of the base unit 2 and an adjacent edge 9 of the display screen unit 3 similar to the flexible pipe 56 shown in FIG. 6.

By using a purge gas conduit 84 to convey excess hydrogen from the anode flow path to the fan duct 85 during purge cycles, the high humidity hydrogen purge exhaust is diluted into the fan duct air stream 87. The fan duct air stream 87 is generally pre-heated by virtue of its passage over heat-generating elements 88 in the base unit 2, such as the processor and other electronic devices. The warmed air stream 87 serves to dilute the hydrogen and reduce the humidity of the hydrogen purge exhaust by raising the temperature thereof. This reduces likelihood of condensation around an exhaust vent 89 in the base unit 2.

Various other features may be provided in relation to the fuel cell arrays 31 in the display screen assembly.

To reduce heat transfer from the fuel cell arrays 31 to the adjacent display panel 10, a thermal barrier may be disposed between the fuel cell array 31 and the display panel 10. Preferably, the thermal barrier comprises a thermally conductive planar element having an in-plane thermal conductivity substantially greater than its through-plane thermal conductivity so that heat from the fuel cell array 31 is moved laterally to the edges of the fuel cell array where it may be dissipated via peripheral apertures 41 of the aperture array 42 of grilles 15a, 15b, or dissipated by some other heat sinking element of the protective cover 11. The thermally conductive planar element may comprise graphene, and may comprise a thermally insulative backing layer with graphene.

To reduce water condensation at the ventilation apertures arising from potentially saturated air flows through the apertures 41 of the grilles 15a, 15b, a hydrophobic coating may be provided on the surfaces defining the mesh 44. This assists in preventing or reducing water beading on the apertures and risking air flow blockages.

To reduce water condensation at or near the ventilation apertures, or to prevent/inhibit water ingress through the ventilation apertures 41 of the grilles 15a, 15b, a separate hydrophobic, air-permeable (e.g. breathable) membrane (such as a polymer membrane) may be disposed between the grille mesh 44 and the fuel cell array 31 air breathing face. The breathable membrane may have a mesh size of around 100 microns or less to prevent water ingress into the fuel cell array 31 air breathing face.

Where fluid pipes, e.g. flexible pipe 56, extend across the hinge assembly 7 without passing through a hinge 50, the flexible pipe is preferably protected by an appropriate sleeve or by co-operating shields on the back edge 8 of the base unit 2 and/or on the adjacent edge 9 of the display screen unit 3.

The fuel cell arrays 12a, 12b are provided with suitable control functionality for maintaining appropriate operational conditions, e.g. hydrogen flow, purge control, based on suitable sensed parameters such as humidity, temperature, voltage output, current demand etc. The control functionality may be provided as an independent fuel cell microprocessor controller that is separate from any general purpose microprocessor of the computing device 1. The controller may be configured to interface with an operating system or application software running on the general purpose microprocessor of the computing device 1. Alternatively, the fuel cell control functionality may be provided as control software running on the general purpose microprocessor of the computing device. Usage and control data from the fuel cell control functionality may be provided for onward transmission to a remote server or database external to the computing device 1 using communication channels conventionally found on such computing devices 1, such as by wifi, local area network, mobile telecommunication channel or Bluetooth.

In the embodiments described in relation to FIG. 7, where there is force ventilation of the fuel cells 30 by way of the cooling fan 70, the fuel cell arrays 12a, 12b are disposed in the display screen unit 3 and the air inlet for drawing in air flow 71 is provided in the base unit 2. The cooling air is directed across the hinge assembly 7 by way of air flow guide 75. This may be alternatively configured such that the fuel cell arrays are disposed in the base unit 2 and air inlet flow is drawn from ventilation grilles 15a, 15b in the display screen unit 3 using a fan in the base unit 2 which draws air through air flow guides similar to air flow guides 75, 76 of FIG. 7, which traverse the hinge assembly 7.

Positioning air intakes in the display screen unit 3, and passing air through to a fuel cell in the base unit may reduce the likelihood that air vents for a fuel cell in the base unit could become partially or fully occluded in use by surfaces on which the laptop 1 is placed. The outward face 14 of the display screen unit 3 is more likely to remain free of obstruction during use, particularly since there is generally a much greater surface area available for the air intake.

Although illustrative embodiments described above show a pair of planar fuel cell arrays taking up a minor proportion of the display screen unit surface area, this could be increased up to and including fuel cell arrays occupying the full surface area of the surface 14.

Other embodiments are within the scope of the appended claims.

The invention claimed is:

1. A portable computing device comprising:
a base unit and a display screen unit coupled together by a hinge assembly configured to allow rotation of the base unit and the screen unit relative to one another, the display screen unit having a display panel on a first face of the display screen unit and a fuel cell array disposed adjacent to a second face of the display screen unit,
a plurality of ventilation apertures extending through the second face of the display screen unit and being configured to provide air flow to the fuel cell array, the plurality of ventilation apertures having a hydrophobic coating;
a fluid conduit extending between the display screen unit and the base unit, the fluid conduit providing a purge fluid flow path from a purge outlet of the fuel cell array to a fan duct in the base unit; and,
wherein the hydrophobic coating reduces water beading or condensation.

2. The portable computing device of claim 1 further including a fuel conduit extending between the base unit and the display screen unit across the hinge assembly, the fuel conduit configured for delivering fuel from the base unit to the display screen unit.

3. The portable computing device of claim 2 wherein the fuel conduit extends through the hinge assembly.

4. The portable computing device of claim 2 further including a fuel source incorporated within the base unit.

5. The portable computing device of claim 2 further including a fuel supply connector within the base unit.

6. The portable computing device of claim 1 further including a power conductor extending between the fuel cell array in the display screen unit and the base unit via the hinge assembly.

7. The portable computing device of claim 1 further including a water conduit extending between the fuel cell array in the display screen unit and the base unit through the hinge assembly.

8. The portable computing device of claim 1 further including an air flow conduit extending between the base unit and the display screen unit across the hinge assembly, the air flow conduit providing an air flow path extending between a fan in the base unit and the fuel cell array in the display screen unit.

9. The portable computing device of claim 1 further including a thermal barrier disposed between the fuel cell array and the display panel.

10. The portable computing device of claim 9 wherein the thermal barrier comprises a thermally conductive planar element having an in-plane thermal conductivity substantially greater than its through-plane thermal conductivity.

11. The portable computing device of claim 1, wherein the ventilation apertures comprise an array of apertures in hexagonal configuration.

12. The portable computing device of claim 1, wherein the ventilation apertures define a grid of between 50% and 80% aperture density.

13. The portable computing device of claim 1, wherein the ventilation apertures have a hydrophobic mesh positioned thereover.

14. The portable computing device of claim 1 further including a fuel cell controller operable on, or interfacing with, a main data processing engine of the portable computing device.

15. The portable computing device of claim 1, wherein the plurality of ventilation apertures are disposed on a ventilation grille on the second face of the display screen unit adjacent the fuel cell array.

* * * * *